United States Patent [19]

Lahr et al.

[11] Patent Number: 4,678,624
[45] Date of Patent: Jul. 7, 1987

[54] METHOD FOR LOADING FUEL RODS INTO A CONTAINER

[75] Inventors: Helfrid Lahr, Karlsdorf; Bernd Pontani, Alzenau, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 881,007

[22] Filed: Jul. 1, 1986

Related U.S. Application Data

[62] Division of Ser. No. 767,180, Aug. 19, 1985.

[30] Foreign Application Priority Data

Aug. 17, 1984 [FR] France .................. 3430244

[51] Int. Cl.⁴ .................. G21C 19/00; G21F 5/00
[52] U.S. Cl. .................. 376/261; 376/272; 206/443; 414/146; 53/236; 53/444
[58] Field of Search .................. 376/261, 260, 272, 264, 376/269; 250/506.1, 507.1; 220/85 F; 206/443, 821; 414/292, 291, 146; 252/633; 53/444, 236, 235, 540, 148, 467, 475, 149, 150

[56] References Cited

U.S. PATENT DOCUMENTS

| 3,677,328 | 7/1972 | Buzzi et al. | 376/272 |
| 4,149,087 | 4/1979 | Artemiev et al. | 376/272 |
| 4,183,192 | 1/1980 | Smaw | 53/236 |
| 4,324,523 | 4/1982 | Zablocky | 206/443 |

FOREIGN PATENT DOCUMENTS

| 0043096 | 1/1982 | European Pat. Off. | 376/272 |
| 0171774 | 2/1986 | European Pat. Off. | 250/506.1 |

Primary Examiner—Deborah L. Kyle
Assistant Examiner—Daniel Wasil
Attorney, Agent, or Firm—Walter Ottesen

[57] ABSTRACT

A method and an apparatus for loading containers with individual fuel rods or fuel-rod sections of irradiated nuclear reactor fuel elements are disclosed. In order to ensure maximum safety, cleanliness and close packing when loading the containers, the fuel rods or fuel-rod sections are horizontally front-loaded into the container which is horizontally positioned. The loading aperture is located as closely as possible to the upper inner periphery of the container. Following their insertion, the fuel rods or fuel-rod sections will drop onto the inner wall surface of the container or onto the already existing pile of previously loaded fuel rods or fuel-rod sections. The container for loading with such a method has a loading aperture in the end wall thereof arranged close to the inner periphery thereof for insertion of the fuel rods or fuel-rod sections. The apparatus for loading containers in accordance with the method disclosed includes a loading trough which is insertable into a loading aperture in the container and serves to load the fuel rods or fuel-rod sections. The loading trough is capable of being rotated about its longitudinal axis whereupon the fuel rod or fuel-rod section drops down.

5 Claims, 11 Drawing Figures

METHOD FOR LOADING FUEL RODS INTO A CONTAINER

This is a division of application Ser. No. 767,180, filed Aug. 9, 1985.

FIELD OF THE INVENTION

The invention relates to a method and apparatus for loading a container with separated fuel rods or with cut fuel-rod sections of irradiated nuclear reactor fuel elements. A container for receiving the irradiated material is also disclosed.

BACKGROUND OF THE INVENTION

It has been proposed to handle the direct terminal storage of fuel elements such that the fuel elements are disassembled and the individual fuel rods are then placed in terminal storage containers more closely packed than was previously possible. This close packing of the fuel rods has the advantage that a larger number of fuel elements can be accommodated in a terminal storage container.

Further, it has been proposed to cut up the individual fuel rods into sections and then load the same into the containers provided. This permits smaller storage unit sizes for direct terminal storage. In contrast to terminal storage containers filled with whole fuel rods, this would afford the advantage of permitting the handling of terminal storage containers of shorter lengths and lower weights in the terminal storage mining depot.

Further, this method makes it possible to use storage unit sizes the dimensions of which correspond to the terminal storage cans of highly active waste glass. In the mining depot, this would have the advantage that only one storage unit size for highly active waste has to be handled.

When separating the fuel rods from the fuel element or when cutting up fuel rods and loading them into a container, the problem arises that the outside of the container becomes contaminated by the radioactive cell atmosphere. Further, it is desirable to pack the fuel rods or fuel-rod sections as closely as possible in order to make optimum use of the storage space.

SUMMARY OF THE INVENTION

It is an object of the invention to provide a method of the above-mentioned type which permits a safe, clean and dense loading of the containers.

The fuel rods or cut up sections thereof are front-loaded into the container in horizontal position. Since this takes place close to the upper inner periphery of the container, the container can be optimally loaded with the fuel rods or fuel-rod sections. The method of the invention requires only a small loading aperture in the container end wall. If the loading aperture is to be welded in a conditioning facility after loading, this small aperture represents still another advantage.

In another advantageous embodiment of the invention, the inner chamber of the container is subjected to a partial vacuum during loading, with the extracted air being conducted through a filter prior to leaving the container. By virtue of this method, dust developed during the separation of the fuel rods from the fuel element or when cutting the fuel rods can be drawn directly into the container after the separating or cutting facility is connected to the vacuum air system. Aerosols and fuel particles remain almost completely in the container into which the fuel rods or fuel-rod sections are loaded.

In an advantageous improvement of the invention, the container is loaded in a work chamber which is separate from the chamber in which the fuel rods are separated, cut up or supplied. This prevents contamination of the container to be loaded.

The invention also relates to a container to be loaded with fuel rods or fuel-rod sections according to the method of the invention. The container to be loaded has two closed small-diameter bores in its end wall. The two bores define an opening for loading and for the discharge of air, respectively. The fuel rods or fuel-rod sections are introduced through the loading opening. Via the air discharge opening, the container may be connected with a vacuum source whereby a drop in pressure from the outside to the container interior develops, so that the material held in the container cannot constitute a risk of contamination for the container exterior.

The invention also relates to an apparatus for loading the containers with fuel rods or sections of individual fuel rods of irradiated nuclear reactor fuel elements in accordance with the method of the invention. This apparatus includes a loading trough which is horizontally arranged and is insertable into a loading aperture in the end wall of the container for pushing the fuel rods or fuel-rod sections into the container. The loading trough is rotatable about its longitudinal axis.

The fuel rods or cut fuel-rod sections are loaded into the container via the loading trough. The loading trough is then rotated so that its open side is face down. The fuel rods or fuel-rod sections drop down onto the container inner wall surface or onto an already existing pile of previously loaded fuel-rod sections. The loading trough is suitably arranged as closely as possible to the upper inner wall surface of the horizontally mounted container.

In an advantageous embodiment of the invention, the feed conduit connects the separating facility for separating the individual fuel rods from the fuel element or the fuel-rod cutting device with the interior of the container to be loaded so that dust and aerosols developed during separation or cutting of the fuel rods are drawn into the container to which a partial vacuum is applied. As a result, the cell atmosphere is exposed to extremely low amounts of aerosols and fragments of fissile material.

Advantageously, separating or cutting the fuel rods and loading the container are performed in separate work chambers. This still further reduces the risk of contamination of the outer surface of the container. A container can be loaded through the closable pass-through openings if the loading aperture of the container is in alignment with the corresponding pass-through opening in the ventilation partition wall.

According to another feature of the invention, a filter is mounted in the container so as to be parallel to the axis of the container. The filter permits filtered air to flow out from the container during loading thereof. The aerosol and fissile particles are thereby caused to remain in the container.

According to still another feature of the invention, fuel rods are separated or cut as well as fed and loaded in the presence of a protective gas. The oxygen-deficient atmosphere thereby obtained prevents self-ignition of the developing dust.

Also, the container is charged with a test gas so that the loaded container can be tested for leaks in follow-on handling steps.

The invention permits loading separated fuel rods of irradiated nuclear reactor fuel elements as whole fuel rods or as cut up fuel-rod segments into containers in an orderly manner for subsequent interim or terminal storage. The invention allows a high loading density with a very small loading aperture. This feature already contributes to reduce the risk of contamination of the outer surface of the container. Further embodiments of the invention almost entirely prevent contamination of the outer surface of the container and permit the various method steps such as separating, cutting, feeding and loading to be performed in a clean manner because, with the further embodiments of the invention, the aerosols and fissile material fragments developed in these steps are drawn into the container to be loaded in an extremely advantageous manner.

The invention described solves the engineering problem of loading a container with fuel rods or fuel-rod sections.

BRIEF DESCRIPTION OF THE DRAWING

The invention will now be described in more detail with reference to the drawing. For better clarity, devices not essential for the understanding of the invention are not illustrated. In the drawing.

DESCRIPTION OF THE PREFERRED EMBODIMENTS OF THE INVENTION

Figure 1:
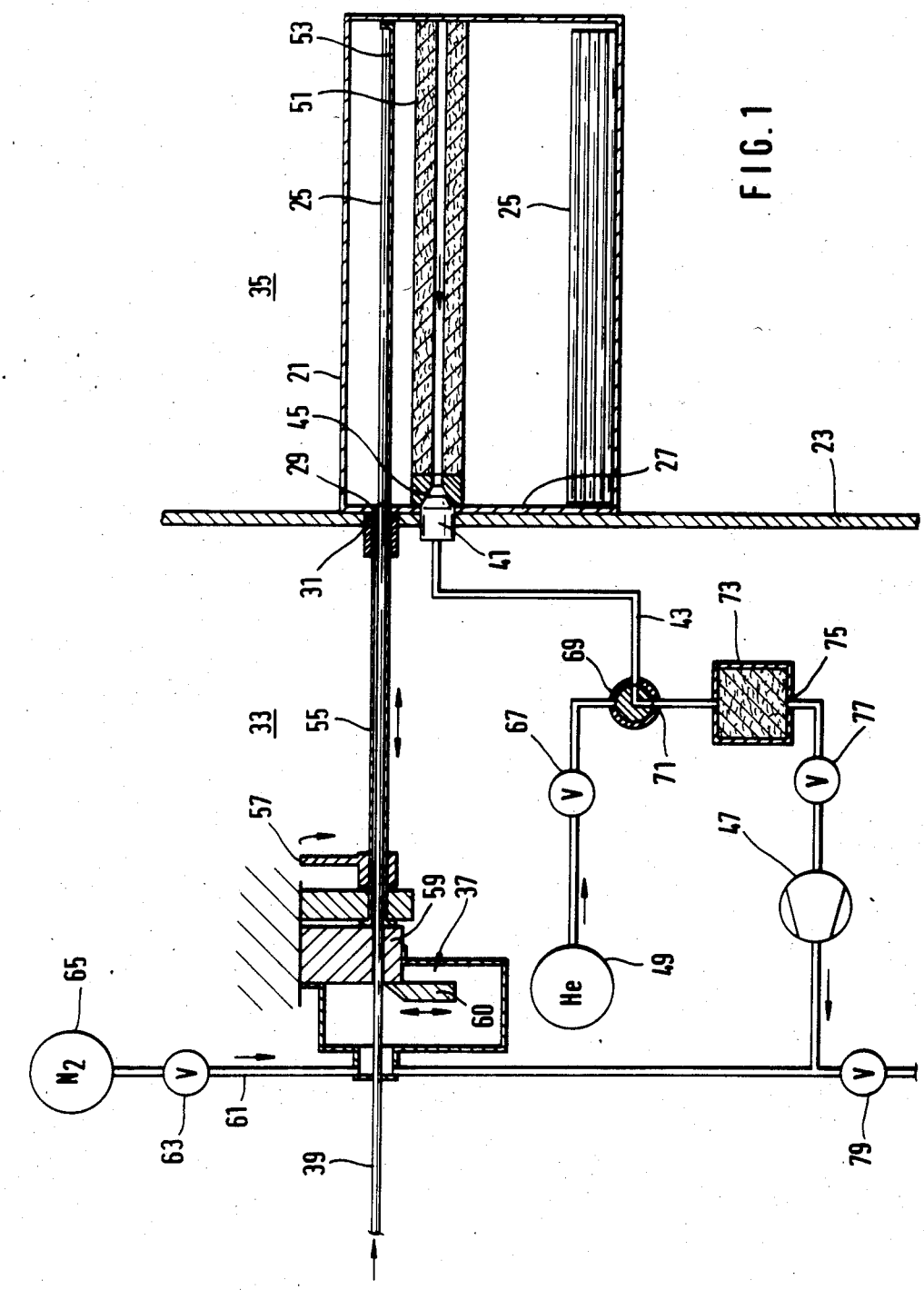
FIG. 1 is a schematic of an apparatus for loading fuel-rod sections, with a container shown as it is being loaded.

In FIG. 1, a container 21 is horizontally docked to a ventilation partition wall 23. In this embodiment, the container 21 is in the form of a can which is welded closed after being loaded with fuel-rod sections 25 and is then transferred to a terminal storage container. The can or container 21 has a loading aperture 29 in the upper area of its inner periphery. The loading aperture 29 is located in the end wall 27 of the container facing toward the ventilation partition wall 23. The loading aperture 29 is in alignment with a pass-through opening 31 in the partition wall 23.

The ventilation partition wall 23 divides the working area into two separate rooms or chambers 33 and 35 with each chamber having its own air system. In chamber 35, the container 21 is handled and loaded. Chamber 33 is exposed to open radioactivity because it receives the fuel rods and accommodates a cutting shear 37 for cutting up the fuel rods 39 into fuel-rod sections.

The container 21 is connected via a second coupling 41 with a conduit 43 extending through the partition wall 23. In this second coupling 41, an air discharge opening 45 of the container 21 is connectable with either a partial vacuum source 47 or a pressure source of helium gas 49 via a suitable valve (described in more detail in the following). A filter 51 for suspended material is placed ahead of the air discharge opening 45 and is located within and extends parallel to the longitudinal axis of the container 21. The air discharge opening 45 is likewise arranged very close to the outermost inner periphery of the container 21.

A loading trough 53 extends through the loading aperture 29 of the container 21 and continues in a closed feed conduit 55 outside the interior of the container. A pivot drive 57 is fastened to the feed conduit 55 and is adapted to rotate the latter about its longitudinal axis. The feed conduit 55 extends up to a stationary overarm 59 of the cutting shear 37. The fuel rods 39 are fed into the cutting shear 37 in a stepwise manner where they are cut into individual sections 25 by a vertically movable cutting knife 60.

The cutting shear 37 is connected with a source 65 of inert gas via a conduit 61 and a shutoff valve 63 and is charged with this gas. The source of inert gas 65 also communicates with the air system of the interior of the container 21 via the cutting shear 37 and the feed conduit 55.

The helium gas source 49 is connectable with the interior of the container 21 via another shutoff valve 67 and a rotary slide valve 69. The rotary slide valve 69 has a second output 71 connected with a fine filter 73. The output 75 of fine filter 73 is connected via a shutoff valve 77 with a compressor 47 for generating a partial vacuum. The output of the compressor 47 is connectable with the cell exhaust air system via the conduit 61 and a shutoff valve 79.

Figure 2:
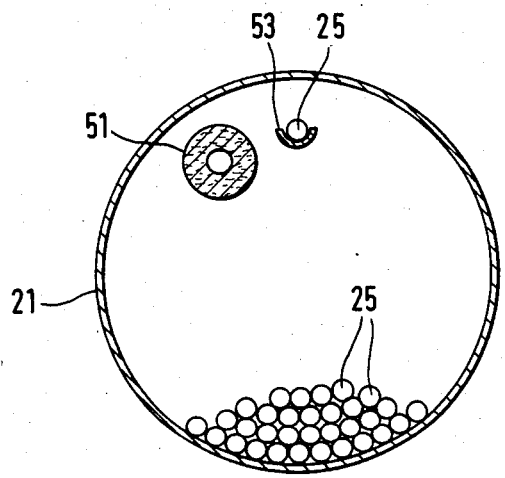
FIG. 2 is a schematic cross-sectional view of the container to be loaded.
Figure 3:
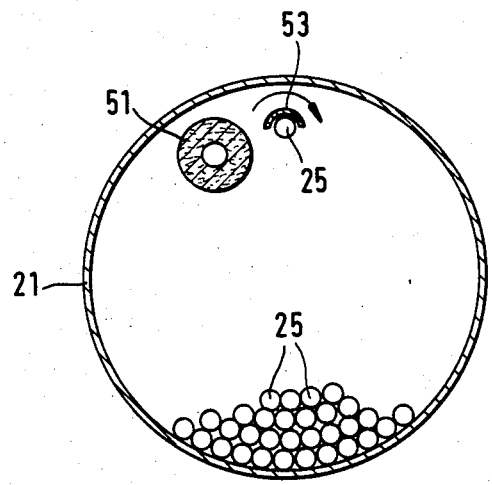
FIG. 3 is a schematic cross-sectional view of the container of FIG. 2 showing the loading trough rotated for dropping a fuel-rod section.

It will be seen from FIGS. 2 and 3 that the respective connections for loading and venting the container 21 are located as closely as possible to the inner periphery of the latter. FIG. 2 shows the loading trough 53 as a fuel-rod section 25 is being inserted. Following its insertion, the loading trough 53 is rotated (FIG. 3), causing the fuel-rod section 25 to drop down onto the container inner wall surface or onto the already existing pile of orderly loaded fuel-rod sections 25.

Figure 4:
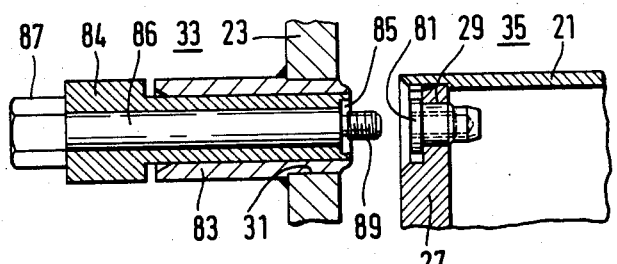
FIGS. 4 to 9 are views of the loading aperture in the container as well as of the feed opening in the ventilation partition wall at various stages of loading.

The loading aperture 29 of the container 21 is provided in one of its two end walls 27 and sealed by a plug 81 when the container 21 is not connected (FIG. 4). A guide stub 83 is welded into opening 31 of the ventilation partition wall 23. A receiving fixture 84 is snugly seated in guide stub 83 and has an end extending into the loading and handling chamber 35. This end has a circular recess 85 the inner diameter of which corresponds to the outer diameter of the sealing plug 81. An insert key 86 is rotatably mounted in the receiving fixture 84 and has an actuating hexagon head 87 at its outer end which is located in the shearing chamber 33. A threaded pin 89 is provided at the end of the insert key 86 which extends through the ventilation partition wall 23. The outer thread of the threaded pin 89 corresponds to an inner or tapped thread provided in the sealing plug 81 of the loading aperture 29. The inner thread is in alignment with the threaded pin 89 when the container 21 is docked to the wall.

Figure 5:
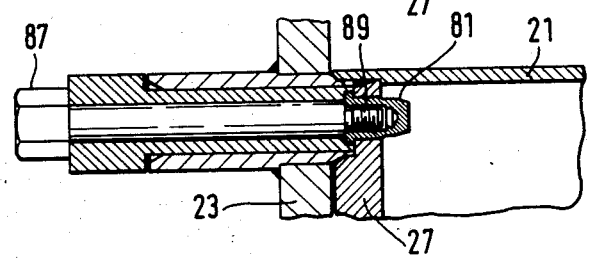

As shown in FIG. 5, the threaded pin 89 can threadably engage the inner thread of the sealing plug 81 by actuating the hexagon head 87. This step is performed after the container 21 is docked to the partition wall 23 with its end wall 27 in which the loading aperture 29 is provided.

Figure 6:
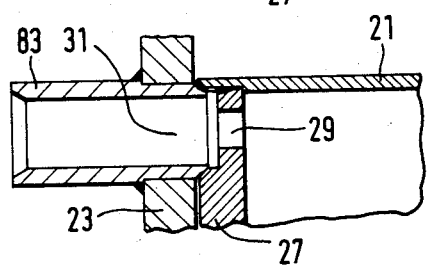

The receiving fixture 84 and the insert key 86 are adapted to be withdrawn from the guide stub 83 as a unit. In this step, with the threaded pin 89 threadably engaged with the plug 81, the plug 81 is pulled into the shearing chamber 33 through the guide stub 83. The surface of the sealing plug 81 remains in the recess 85 of receiving fixture 84 and is thus protected against contamination in the shearing chamber 33. The loading aperture 29 is now clear (FIG. 6).

A feed conduit guide 91 (FIG. 7) through which the feed conduit 55 is introduced into the container 21 is insertable into the guide stub 83.

The second coupling 41 (FIGS. 10 and 11) includes a second pass-through opening 93 in the partition wall 23. Opening 93 is in alignment with the adjacent air discharge opening 45 of the container 21 when the container is docked. A receiving stub 95 is welded into the opening 93. The receiving stub 95 has an inner peripheral abutment surface 97 for a bearing member 99 with a spherically-shaped outer surface. The bearing member 99 is pressed against the surface 97 by a nut 101. Bearing member 99 and nut 101 have center bores for receiving a coupling member 103 therein which, in turn, has an axially parallel inner bore. The coupling member 103 is loaded in the direction of the container 21 by a pressure spring 105. The coupling member 103 is fixedly attached to conduit 43 which includes a flexible compensating member (not shown) to permit an axial movement of the coupling member 103.

Figure 11:
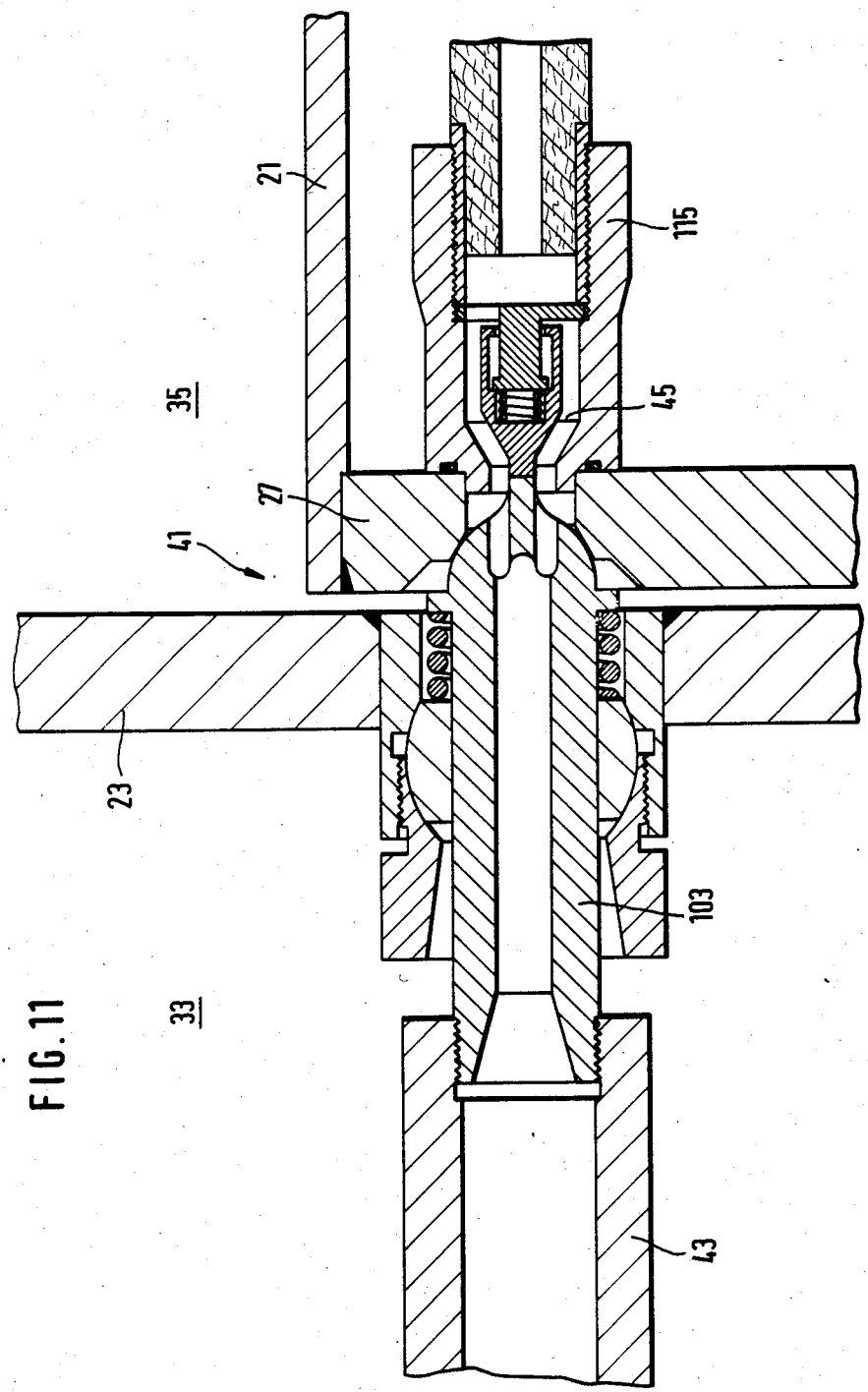

A valve 107 is seated in the aligned air discharge opening 45 of the container 21. The valve cone 109 is loaded by a pressure spring 111 which is supported on an end piece 113 of the filter 51. The filter 51 is arranged in the container 21 so that its longitudinal axis is parallel to the longitudinal axis of the container. The valve housing 115 surrounds the air discharge opening 45 and forms a valve seat 117. The valve cone 109 has an outwardly projecting lug 119 adapted to be acted upon by a lug 121 of the coupling member 103 in the partition wall 23. With the container 21 docked to the partition wall 23, the coupling member 103 lifts the valve cone 109 clear of its valve seat 117 (FIG. 11). The spring loading the coupling member 103 and the mounting of the latter to permit swivelling thereof help to compensate for alignment tolerances.

The mode of operation of the embodiment described above will now be described.

The container 21 to be loaded is supplied with the loading aperture 29 sealed. The container 21 is placed horizontally against the vertical partition wall 23 so that its end wall in which the loading aperture 29 is located faces the wall 23. The loading aperture 29 is tightly sealed by the plug 81 and the pass-through opening 31 in the partition wall 23 is tightly closed by the receiving fixture 84 and the insert key 86 (FIG. 4).

Also, in the second coupling 41, the two openings 45 and 93 which are provided in the end wall 27 and the partition wall 23, respectively, and which will later cooperate, are still in their rest positions. In this rest position, the valve cone 109 is seated on the valve seat 117 thereby closing the air discharge opening 45. The coupling member 103 in the partition wall 23 is in its position of rest (FIG. 10), and the conduit 43 is closed by means of the rotary slide valve 69.

After the end wall 27 is brought into abutment with the partition wall 23 and the openings 29 and 45 in the end wall 27 are in alignment with the respective openings 31 and 93 in the partition wall 23, the valve cone 109 will be lifted from its valve seat 117 because the lug 121 of the spring-loaded coupling member 103 displaces the valve cone 109 axially inwardly (FIG. 11).

In the first coupling between the loading aperture 29 and the pass-through 31, the insert key 86 is rotated by actuating the hexagon head 87 such that the threaded pin 89 threadably engages the inner thread of the sealing plug 81 (FIG. 5). By axially withdrawing the insert key 86 into the shearing chamber 33, the sealing plug 81 is pulled into the recess 85 of the receiving fixture 84. A further withdrawing movement pulls the insert key 86 out of the guide member 83 together with the receiving fixture 84 and the sealing plug 81 held therein. In this way, the insert key 86, guide member 83 and sealing plug 81 are pulled into the shearing chamber 33. The loading aperture 29 as well as the pass-through opening 31 are clear (FIG. 6).

Figure 7:
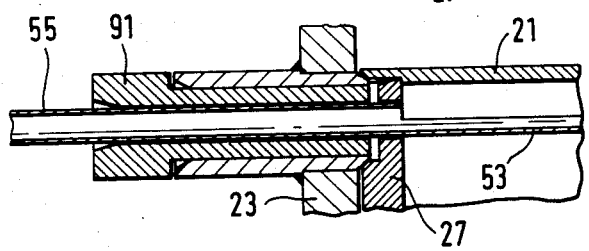

The feed conduit guide 91 is then inserted into the pass-through opening 31. With its forward loading trough 53 first, the feed conduit 55 is pushed into the center bore of the feed conduit guide 91 until the loading trough 53 is completely received in the interior of the container (FIG. 7). The loading trough 53 then extends parallel to the container cylindrical surface over its entire inner length.

Via the second coupling 41, the interior of container 21 is connected with the partial vacuum source 47 by rotating the rotary slide valve 69 (position as shown in FIG. 1). The container interior is thus exposed to a partial vacuum.

The source of inert gas 65 applies inert gas to the shearing device 37 and to the feed conduit 55. This prevents a possible self-ignition of dust developing during the cutting step. The fuel rods 39 are fed to the shearing device 37 in a stepwise manner. The cut fuel-rod sections 25 are thereby automatically pushed along the feed conduit 55 and fed to the loading trough 53. When a fuel-rod section 25 is completely received in the loading trough 53, the pivot drive 57 is actuated to rotate the loading trough 53 by 180°. The fuel-rod section 25 in the trough 53 will thus drop from there down onto the inner wall surface of the container or, in the further loading process, onto the previously loaded orderly pile of fuel-rod sections 25.

The shearing device 37 and the feeding of the cut fuel-rod sections 25 are air sealed relative to the shearing chamber 33, so that the feed conduit 55, as a result of the partial vacuum developed in the container 21, conducts aerosols, dust and other particles developed in the shearing process into the interior of the container 21. These aerosols and solid particles remain in the container 21 since they are retained there by the filter 51 which is inserted ahead of the air discharge opening 45. Thus, after being fully loaded, the container 21 contains not only the fuel-rod sections 25 but also, in a most advantageous manner, the radioactive aerosols and dust particles. The filter 51 also remains in the container 21.

Figure 8:
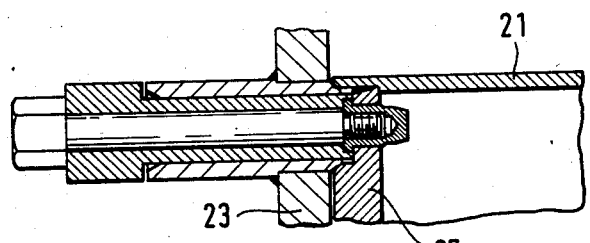

When the container 21 is loaded with the predetermined quantity of fuel-rod sections 25, the feed conduit 55 and the loading trough 53 will be withdrawn in the direction of the shearing chamber 33. The insert key 86 together with the receiving fitting 84 and the threadably engaged sealing plug 81 are inserted into the pass-through opening 31 (FIG. 8). The sealing plug 81 is again threadably fastened in the loading aperture 29 thereby closing the latter. The interior of the container continues to be connected to the partial vacuum source 47.

Then the rotary slide valve 69 is rotated into a position in which the source of helium gas 49 is connected with the conduit 43 and thus with the container interior. The vacuum source 47 is thereby disconnected. The interior of the container 21 is sprayed with helium from the helium gas source 49 in order to permit a subsequent leakage test of the filled and sealed container 21. For a complete sweeping of the container 21 with helium, the application of a partial vacuum to the container 21 alternates with the application of helium several times; this is accomplished by suitably rotating the rotary slide valve 69.

Figure 9:
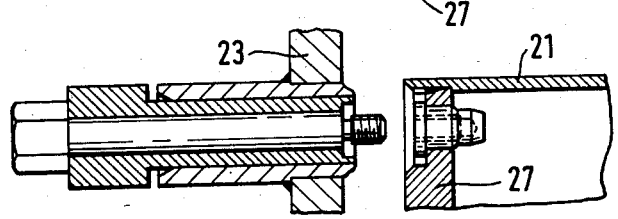
Figure 10:
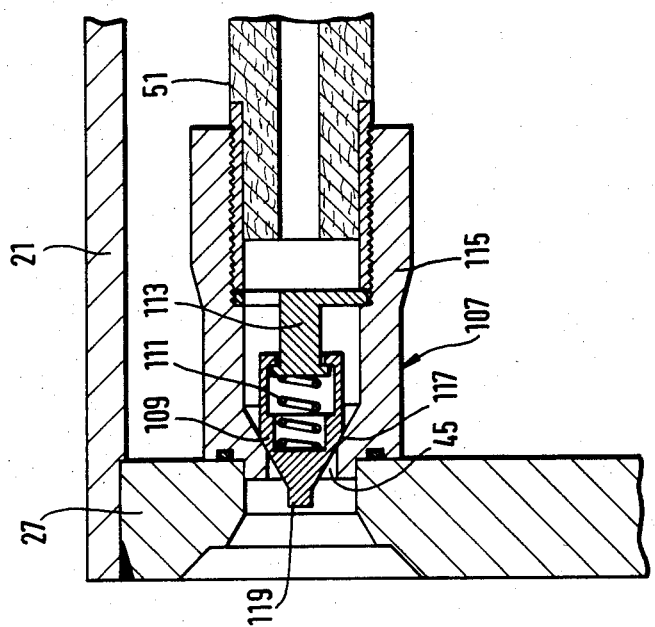
FIG. 10 is a view of the filter arranged in the container and shows an arrangement for connecting it to the air system; and, FIG. 11 is a view of the coupling end of the filter and its connection in the ventilation partition wall with the container shown docked to the partition wall.
Figure 10:
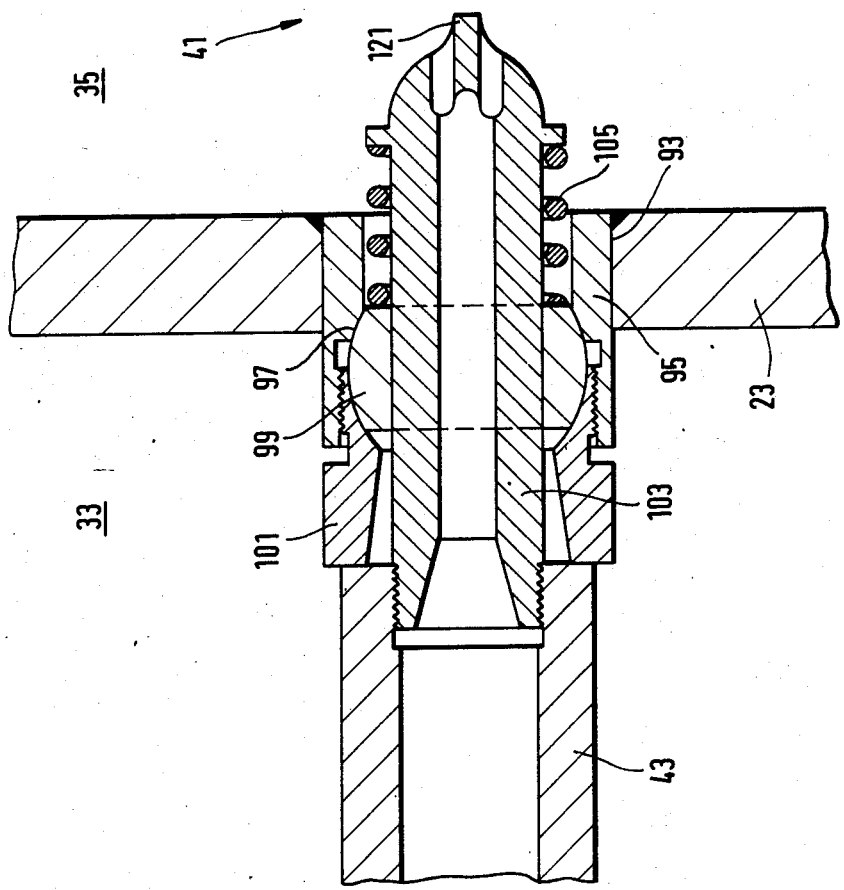

Thereafter, the container 21 is moved away from the partition wall 23 FIG. 9). This automatically closes the air discharge opening 45 in the second coupling 41 because the valve cone 109 is again urged into seating engagement with the valve seat 117 by the load of the pressure spring 111 (FIG. 10). The rotary slide valve 69 is rotated to a closed position.

Loading the container 21 with fuel-rod sections 25 is thus accomplished without the risk of contaminating the outer surface of the container 21. This facilitates the further handling of the filled container 21. The container 21 is then placed in a terminal storage container and can be sent for terminal storage in a mining depot.

It is understood that the foregoing description is that of the preferred embodiments of the invention and that various changes and modifications may be made thereto without departing from the spirit and scope of the invention as defined in the appended claims.

What is claimed is:

1. Method of loading a container with individual fuel rods separated from an irradiated nuclear reactor fuel element, the container having an end wall with an opening formed therein close to the inner periphery thereof, the method comprising:

positioning said container in a horizontal position so that said opening is above the lower inner wall surface of said container;

feeding said fuel rods into said container through said opening in a substantially horizontal direction; and, dropping said fuel rods inside said container so as to cause the same to fall down toward said lower inner wall surface thereby causing said fuel rods to pile up inside said container.

2. The method of claim 1, comprising the further steps of:

applying a partial vacuum to the interior of said container as said fuel rods are fed into the latter; and, passing the air drawn from said interior through a filter before the withdrawn air leaves said container.

3. The method of claim 2, wherein said fuel rods are separated from said fuel elements and are fed toward said container in a first chamber, said container being positioned in a second chamber wherein said fuel rods are dropped into the same.

4. The method of loading a container of claim 1, comprising the further step of cutting said fuel rods into fuel-rod sections and then feeding said fuel-rod sections into said container.

5. The method of claim 4, comprising the further steps of:

applying a partial vacuum to the interior of said container as said fuel-rod sections are fed into the latter; and, passing the air drawn from said interior through a filter before the withdrawn air leaves said container.

* * * * *

UNITED STATES PATENT AND TRADEMARK OFFICE
CERTIFICATE OF CORRECTION

PATENT NO. : 4,678,624

DATED : July 7, 1987

INVENTOR(S) : Helfrid Lahr and Bernd Pontani

It is certified that error appears in the above-identified patent and that said Letters Patent is hereby corrected as shown below:

On the title page, under the heading "Foreign Application Priority Data": delete "[FR] France" and substitute -- [DE] Fed. Rep. of Germany -- therefor.

In column 1, line 6: delete "Aug. 9, 1985." and substitute -- Aug. 19, 1985. -- therefor.

In column 7, line 16: delete "FIG. 9)." and substitute -- (FIG. 9). -- therefore.

Signed and Sealed this

Twenty-ninth Day of September, 1987

Attest:

DONALD J. QUIGG

*Attesting Officer*    *Commissioner of Patents and Trademarks*